US012705241B2

(12) United States Patent
Li et al.

(10) Patent No.: US 12,705,241 B2
(45) Date of Patent: Aug. 11, 2026

(54) VECTOR SEARCH METHOD AND APPARATUS

(71) Applicant: Huawei Technologies Co., Ltd., Shenzhen (CN)

(72) Inventors: Haotian Li, Shenzhen (CN); Debao Li, Hangzhou (CN); Qintao Zhang, Hangzhou (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 0 days.

(21) Appl. No.: 19/095,702

(22) Filed: Mar. 31, 2025

(65) Prior Publication Data

US 2025/0225132 A1 Jul. 10, 2025

Related U.S. Application Data

(63) Continuation of application No. PCT/CN2022/123318, filed on Sep. 30, 2022.

(51) Int. Cl.
*G06F 7/00* (2006.01)
*G06F 16/2455* (2019.01)
*G06F 16/28* (2019.01)

(52) U.S. Cl.
CPC ........ *G06F 16/2455* (2019.01); *G06F 16/285* (2019.01)

(58) Field of Classification Search
CPC ........................... G06F 16/2455; G06F 16/285
USPC .................................................. 707/600–899
See application file for complete search history.

(56) References Cited

U.S. PATENT DOCUMENTS

2020/0278953 A1 * 9/2020 Yang .................... G06F 16/245

FOREIGN PATENT DOCUMENTS

CN 112749296 A 5/2021
CN 113821667 A 12/2021

OTHER PUBLICATIONS

Papon, Tarikul Islam et al: "A Parametric I/O Model for Modern Storage Devices", Proceedings of the 17th International Workshop on Data Management on New Hardware (DAMON 2021), Jun. 20, 2021, total 11 pages.

Suhas Jayaram Subramanya et al.: "DiskANN: Fast Accurate Billion-point Nearest Neighbor Search on a Single Node", 33rd Conference on Neural Information Processing Systems (NeurIPS 2019), Feb. 13, 2020, total 11 pages.

Minjia Zhang et al.:"Zoom: SSD-based Vector Search for Optimizing Accuracy, Latency and Memory", arXiv:1809.04067v1, Sep. 11, 2018, total 14 pages.

* cited by examiner

*Primary Examiner* — Isaac M Woo
(74) *Attorney, Agent, or Firm* — Conley Rose, P.C.

(57) ABSTRACT

A vector search method includes obtaining a query object, obtaining, by querying a first index, N vector identifiers corresponding to the query object, where the first index is stored in a memory, N is a positive integer, the N vector identifiers include a plurality of first vector identifiers, and the first vector identifier is a vector identifier that is not determined to be recalled, determining, by querying index entries that are in a second index, second vector identifiers corresponding to the plurality of first vector identifiers, the second index is stored in a persistent storage medium, and a compression ratio of a vector in the first index is greater than that of a vector in the second index, and obtaining a query result of the query object based on the second vector identifiers.

20 Claims, 5 Drawing Sheets

VECTOR SEARCH METHOD AND APPARATUS

CROSS-REFERENCE TO RELATED APPLICATIONS

This is a continuation of International Patent Application PCT/CN2022/123318 filed on Sep. 30, 2022, which is hereby incorporated by reference in its entirety.

TECHNICAL FIELD

This disclosure relates to the field of search technologies, and in particular, to a vector search method and apparatus.

BACKGROUND

In the field of vector searches, vector index storage media commonly used in the industry are memories. However, as an amount of data increases from tens of millions to hundreds of millions and tens of billions, costs and overheads of the memories continue to rise. Hybrid storage including a hard disk, for example, a solid-state drive (SSD), and a memory becomes a trend in the industry to resolve a problem of large-capacity data. However, correspondingly, performance deteriorates greatly. Higher technical requirements are imposed on effective use of the SSD to implement performance approximately equivalent to that of pure memory storage.

SUMMARY

Embodiments of this disclosure provide a vector search method and apparatus. In a scenario of hybrid storage including a memory and a persistent storage medium, search accuracy is ensured, a search delay is reduced, and search performance is improved.

According to a first aspect, this disclosure provides a vector search method. The method includes obtaining a query object, obtaining, by querying a first index, N vector identifiers corresponding to the query object, where the first index is stored in a memory, N is a positive integer, the N vector identifiers include a plurality of first vector identifiers, and the first vector identifier is a vector identifier that is not determined to be recalled, determining, by querying index entries that are in a second index and that correspond to the plurality of first vector identifiers, second vector identifiers corresponding to the plurality of first vector identifiers, where the second vector identifier is a vector identifier that is determined to be recalled, the second index is stored in a persistent storage medium, and a compression ratio of a vector in the first index is greater than that of a vector in the second index, and obtaining a query result of the query object based on the second vector identifiers.

First index data with a higher compression ratio and lower storage overheads is stored in the memory, and second index data with a lower compression ratio or no compression but higher storage overheads is stored in the persistent storage medium, to resolve a problem of high memory overheads in a vector search. In addition, search results obtained through the search from the first index are classified, and only a vector identifier of an undetermined category is searched with higher accuracy from the persistent storage medium. This reduces an amount of data to be accessed and a quantity of accesses to the persistent storage medium, and effectively reduces a search delay while ensuring search accuracy.

For example, feature extraction is performed on the query object to obtain a query vector. The N vector identifiers are determined from the first index based on a similarity measurement result between the query vector and a first vector in the first index, where the first index includes a plurality of vector identifiers and a first vector corresponding to each vector identifier, the first index is stored in the memory, and N is a positive integer. Categories of the N vector identifiers are identified, where the category of the vector identifier is a valid category, an undetermined category, or an invalid category. The vector identifier of an undetermined category is determined to belong to a valid category or an invalid category based on a similarity measurement result between the query vector and a second vector that is in the second index and that corresponds to the vector identifier of an undetermined category, where the second index includes a plurality of vector identifiers and a second vector corresponding to each vector identifier, the second index is stored in the persistent storage medium, and a compression ratio of the first vector is greater than a compression ratio of the second vector. A vector identifier of a valid category is recalled to obtain TopK target vector identifiers, where K is a positive integer less than N.

In a possible implementation, identifying categories of the N vector identifiers includes determining, based on a quantized loss value corresponding to a vector identifier, the vector identifier to be a valid category, an undetermined category, or an invalid category. The quantized loss value corresponding to the vector identifier is determined based on a loss between a first vector corresponding to the vector identifier and an unquantized vector of the first vector corresponding to the vector identifier.

In this possible implementation, the quantized loss value may measure a loss between an unquantized vector (namely, an original vector) and a quantized vector. A larger quantized loss value indicates a larger difference between the quantized vector and the original vector, and a less accurate search result matched by using a similarity measurement result. Therefore, the category of the vector identifier may be identified by using the quantized loss value between the unquantized vector and the quantized vector. For example, vector identifiers of some vectors whose quantized loss values are the largest are classified into an invalid category, vector identifiers of some vectors whose quantized loss values are the second largest are classified into an undetermined category, and vector identifiers of some vectors whose quantized loss values are the smallest are classified into a valid category.

In another possible implementation, the vector identifier is determined to be a valid category, an undetermined category, or an invalid category based on a quantized loss value corresponding to a vector identifier, where a quantized loss value corresponding to a vector identifier of a valid category is greater than a quantized loss value corresponding to a vector identifier of an undetermined category, and a quantized loss value corresponding to a vector identifier of an undetermined category is greater than a vector identifier of an invalid category.

For example, the N vector identifiers are sorted in ascending order of loss values, categories of first M vector identifiers are determined to be a valid category, categories of last J vector identifiers are determined to be an invalid category, and categories of the remaining vector identifiers are determined to be an undetermined category, where both M and J are positive integers less than N.

In this possible implementation, search results obtained from the first index data are classified into three categories:

a valid category, an undetermined category, and an invalid category. A search result of an invalid category is directly discarded, to reduce a quantity of high accuracy searches based on the second index in the persistent storage medium. This further reduces an amount of data to be accessed in the persistent storage medium, and improves a search delay.

In another possible implementation, the second index includes a plurality of clustering clusters, each clustering cluster includes a plurality of index entries, each index entry includes a vector identifier and a second vector corresponding to the vector identifier, and all of the index entries in the clustering cluster have a same probability of being accessed in a vector search.

In this possible implementation, index entries that may be simultaneously accessed are clustered, so that an amount of data to be scanned is reduced during disk access, and a search delay is reduced.

In another possible implementation, the index entry includes a vector and an index pointer corresponding to the vector, and the index pointer is related to an identifier of the clustering cluster and an identifier of the vector in the clustering cluster. In an example, the plurality of index entries in the clustering cluster are stored in a same storage area in the persistent storage medium.

In another possible implementation, the vector search method provided in this embodiment of this disclosure further includes aggregating an access request for the persistent storage medium, and aggregating an access request for index entries in a same clustering cluster into a same access request batch. The access request is aggregated to improve a disk read throughput and further reduce a search delay.

In another possible implementation, the vector search method provided in this embodiment of this disclosure further includes reading a candidate index entry set in the second index, where an index entry in the candidate index entry set includes a candidate vector identifier and a second vector corresponding to the candidate vector identifier, and determining a category of the candidate vector identifier to be an undetermined category.

In another possible implementation, reading a second vector corresponding to an undetermined vector identifier set in the second index includes reading the candidate index entry set from level 1 cache space in the memory, where the level 1 cache space stores data that is in the second index and that is accessed at a frequency higher than a preset frequency. In other words, frequently accessed hot data in the second index data is stored in a cache. After the cache hits data, there is no need to access the persistent storage medium, further reducing a search delay.

In another possible implementation, the level 1 cache space further stores the first index in the second index, a probability that a category of a vector identifier in the first index is an undetermined category is greater than a preset probability, and the first index includes a vector identifier and a second vector corresponding to the vector identifier. This increases a read hit rate of a level 1 cache.

In another possible implementation, reading a candidate index entry set in the second index includes reading the candidate index entry set in the second index from the level 1 cache space in the memory, when the candidate index entry set in the second index is not read from the level 1 cache space, reading the candidate index entry set in the second index from level 2 cache space in the memory, and when the candidate index entry set in the second index is not read from the level 2 cache space, reading the candidate index entry set in the second index from the persistent storage medium, where the level 2 cache space stores data read from the persistent storage medium in a previous vector search.

In this possible implementation, the second index data is pre-loaded by using a multi-level cache logic mechanism. In addition to the hot data, low-quality data and data read in a previous search are also cached. This reduces a quantity of accesses to the persistent storage medium, reduces a search delay, and ensures a controllable search delay in both high-frequency search and unpopular search scenarios.

In another possible implementation, the vector search method provided in this embodiment of this disclosure further includes updating the data in the level 2 cache space with data read from the persistent storage medium. For example, the data read from the persistent storage medium in a current search process is used to replace the data in the level 2 cache space.

Optionally, the persistent storage medium is a solid-state drive.

According to a second aspect, this disclosure provides a vector search apparatus. The apparatus includes an obtaining module, a first query module, a second query module, and a recall module. The obtaining module is configured to obtain a query object. The first query module is configured to obtain, by querying a first index, N vector identifiers corresponding to the query object, where the first index is stored in a memory, N is a positive integer, the N vector identifiers include a plurality of first vector identifiers, and the first vector identifier is a vector identifier that is not determined to be recalled. The second query module is configured to determine, by querying index entries that are in a second index and that correspond to the plurality of first vector identifiers, second vector identifiers corresponding to the plurality of first vector identifiers, where the second vector identifier is a vector identifier that is determined to be recalled, the second index is stored in a persistent storage medium, and a compression ratio of a vector in the first index is greater than that of a vector in the second index. The recall module is configured to obtain a query result of the query object based on the second vector identifiers.

In a possible implementation, the second index includes a plurality of clustering clusters, each clustering cluster includes a plurality of index entries, and all of the index entries in the clustering cluster have a same probability of being accessed in a vector search.

In a possible implementation, the index entry includes a vector and an index pointer corresponding to the vector, and the index pointer is related to an identifier of the clustering cluster and an identifier of the vector in the clustering cluster.

In another possible implementation, the plurality of index entries in the clustering cluster are stored in a same storage area in the persistent storage medium.

In another possible implementation, the apparatus further includes an aggregation module. The aggregation module is configured to aggregate an access request for the persistent storage medium, and aggregate an access request for index entries in a same clustering cluster into a same access request batch.

In another possible implementation, the N vector identifiers further include a third vector identifier that is determined to be recalled, and the query result of the query object is related to the third vector identifier.

In another possible implementation, the apparatus further includes an identification module. The identification module is configured to identify the N vector identifiers to obtain the first vector identifier and the third vector identifier, where the third vector identifier is a vector identifier that is determined to be recalled.

In another possible implementation, the identification module is further configured to obtain the first vector identifier and the third vector identifier through identification based on a quantized loss value corresponding to each vector identifier in the N vector identifiers, where a quantized loss value of the third vector identifier in the first index is less than a quantized loss value of the first vector identifier in the first index, and the quantized loss value corresponding to each vector identifier is determined based on a loss between a vector that is in the first index and that corresponds to the vector identifier and an original vector corresponding to the vector identifier.

In another possible implementation, the apparatus further includes a reading module. The reading module is configured to read a candidate index entry set in the second index, where the candidate index entry set includes the index entries that are in the second index and that correspond to the plurality of first vector identifiers.

In another possible implementation, the reading module is further configured to read the candidate index entry set from level 1 cache space in the memory, where the level 1 cache space stores data that is in the second index and that is accessed at a frequency higher than a preset frequency.

In another possible implementation, the level 1 cache space further stores the first index in the second index, and the first index is an index entry corresponding to a vector identifier whose probability of being determined to be the first vector identifier is greater than a preset probability.

In another possible implementation, the reading module is further configured to read the candidate index entry set in the second index from the level 1 cache space in the memory, when the candidate index entry set in the second index is not read from the level 1 cache space, read the candidate index entry set in the second index from level 2 cache space in the memory, and when the candidate index entry set in the second index is not read from the level 2 cache space, read the candidate index entry set in the second index from the persistent storage medium, where the level 2 cache space stores data read from the persistent storage medium in a previous vector search.

In another possible implementation, the apparatus further includes an update module. The update module is configured to update the data in the level 2 cache space with data read from the persistent storage medium to.

Optionally, the persistent storage medium is a solid-state drive.

According to a third aspect, this disclosure provides an electronic device, including a memory and a processor, where the memory stores executable code, and the processor executes the executable code to implement the method provided in the first aspect of this disclosure.

According to a fourth aspect, this disclosure provides a computer-readable storage medium, where the computer-readable storage medium stores a computer program, and when the computer program is executed on a computer, the computer is enabled to perform the method provided in the first aspect of this disclosure.

According to a fifth aspect, this disclosure provides a computer program or a computer program product, where the computer program or the computer program product includes instructions, and when the instructions are executed, the method provided in the first aspect of this disclosure is implemented.

DESCRIPTION OF EMBODIMENTS

The following further describes technical solutions of this disclosure in detail with reference to accompanying drawings and embodiments.

To facilitate understanding of a vector search method and apparatus provided in embodiments of this disclosure, some technical terms in embodiments of this disclosure are briefly described below.

A vector is a group of numbers that represent an object. Such a group of numbers is one vector. If one vector consists of n numbers, the vector is an n-dimensional vector.

Vector search means searching for K-nearest neighbor vectors (KNN) of a query vector in a specific vector data set according to a specific measurement method. However, due to an excessively large amount of KNN computation, we usually focus only on an approximate nearest neighbor (ANN) problem.

To resolve a problem in the Background, the following solutions may be used:

A first solution is a solution of hybrid storage including a disk and a memory by using a graph-based vector search method (for example, a search algorithm like DiskANN or Zoom). A local neighborhood relationship of a nearest neighbor graph is used, and a query point is gradually approached in a greedy search manner. This solution has a high recall rate and a competitive query delay.

Figure 1:
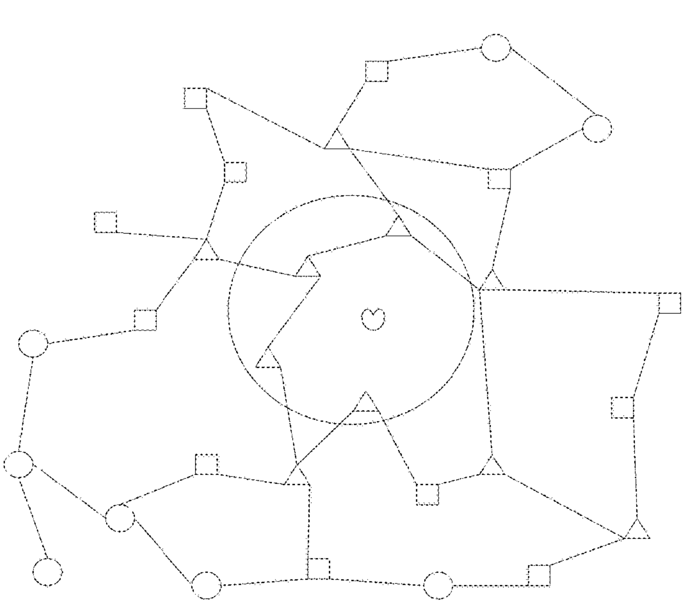
FIG. 1 is a diagram of a vector search method.

Further, an original vector or a high accuracy compressed encoded vector of a data point is stored on an SSD, and most data structures representing relationships between edges are also stored on the SSD. The memory retains low accuracy encoding of all data points and some edge information existing as a cache. As shown in FIG. 1, in a standard query logic, a triangular point and a square point are points on an access path, both the triangular point and an edge related to the triangular point need to access information from an SSD. Therefore, an input/output (I/O) quantity is closely related to a quantity of triangle points and a quantity of edges related to the triangle points. In a recall scenario of topK being less than 100, DiskANN has good performance. However, in a high recall (for example, top 1000+) scenario, because a quantity of triangle points and a quantity of edges related to the triangle points increase linearly, performance deteriorates severely.

It can be learned that in the first solution, the graph-based vector search method is mainly used to resolve a problem of a nearest neighbor search in a low recall (for example, topK=100) large-capacity scenario. However, for a scenario in which a large amount of data is recalled, for example, top 1000+, performance deteriorates severely. For example, in a recall scenario of top 1000+, a quantity of triangle points outside a search circle increases significantly to at least 2000, and an adjacent relationship needs to be considered. These are redundant I/O overheads. In compared with a recall scenario of top 100, a search delay increases exponentially.

A second solution is as following: A hybrid storage capability is provided by using a system-level vector engine, for example, Vearch and Milvus. A general I/O model like Mmap or RocksDB is used for SSD reading. An algorithm procedure is basically the same as that in a pure memory scenario, and is not limited by a characteristic index type.

However, when Vearch and Milvus use Mmap as an I/O model for hybrid storage, if a memory is insufficient, search process overheads are mainly on discarding an update page due to an insufficient page cache resource occupied by a kernel. As a result, original ANN search performance deteriorates by dozens of times.

It can be learned that in the second solution, a medium characteristic of an SSD is not considered, and a local similarity of a vector index is not related. Therefore, there is an obvious disadvantage in an ultra-large-scale scenario, and performance deteriorates seriously.

In conclusion, in the foregoing solutions, in a high (for example, top 1000+) recall scenario, it is difficult to meet both search accuracy and a search delay in a vector search in a scenario of hybrid storage including the memory and the SSD. To ensure high search accuracy, the search delay increases exponentially. Therefore, how to implement high search accuracy and a low search delay in a scenario with a limited memory resource is an extremely challenging problem.

To resolve this problem, an embodiment of this disclosure provides a vector search method. A preliminary search is performed in a memory to obtain rough recall results. The rough recall results are classified and identified, a valid result is recalled, an invalid result is truncated, and an undetermined result is delivered to a hard disk as a candidate set. Then, a high accuracy search is performed on the hard disk, to determine a valid result in the candidate set for recall. The rough recall results are classified and identified, the valid result is recalled, and the invalid result is truncated, so that only the undetermined result is delivered to the hard disk for a search. This reduces a large quantity of accesses to an invalid hard disk, and effectively reduces a search delay while ensuring search accuracy.

Figure 2:
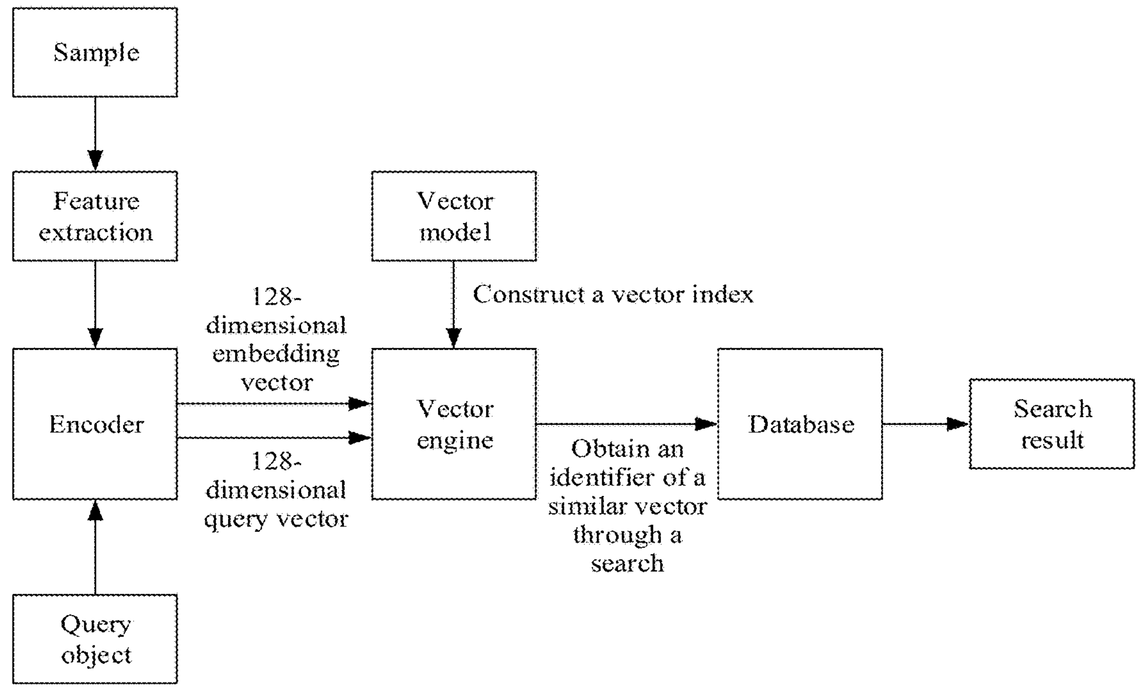
FIG. 2 is a diagram of a system architecture of a search system according to an embodiment of this disclosure.

FIG. 2 is a diagram of a system architecture of a search system. As shown in FIG. 2, the search system includes an encoder, a vector engine, a vector model, and a database. The search system includes an offline preparation phase and an online search phase.

In the offline preparation phase, the following operations are performed on a sample in a data repository: Feature data is extracted from the sample and input into the encoder, the encoder outputs vector data (for example, a 128-dimensional embedding vector in FIG. 2) corresponding to the sample, and then a vector index is output by using the vector data as an input of the vector model. After the operations are performed on all samples in the data repository, a vector index used for a vector search is successfully constructed.

In the online search phase, a query object input by a user is received, the query object is input into the encoder, and a query vector of the query object is output through encoding. The vector engine searches (for example, searches using ANN) a vector index based on the query vector to obtain identifiers of topK similar vectors, where the topK vector identifiers are recalled vector identifiers obtained through a search. Then objects corresponding to the recalled vector identifiers are obtained through a search in the database, and are displayed to the user as a search result.

It may be understood that the search system provided in embodiments of this disclosure is not limited to a vector search of a specific modality. For example, the search system is applicable to a vector search of an image modality, a vector search of a text modality, a vector search of a video modality, and the like.

For example, when the search system is applied to a vector search of an image modality, the sample in the offline preparation phase is an image, the extracted feature data is pixel data of a target image, and the encoder is an image encoder and is configured to encode the pixel data into vector data. The query object input in the online search phase is an image, the database is an image database and a forward database, and the search result is topK images similar to the image, to search for an image by using an image.

When the search system is applied to a vector search of a text modality, the sample in the offline preparation phase is a text, the extracted feature data is a keyword of the text, and the encoder is a word encoder (for example, a Bidirectional Encoder Representations from Transformers (BERT) model) and is configured to encode the keyword into the vector data. The query object input in the online search phase is a text, and the database is a text database (or summary database) and a forward database. The search result is topK pieces of text data similar to the text.

Figure 3:
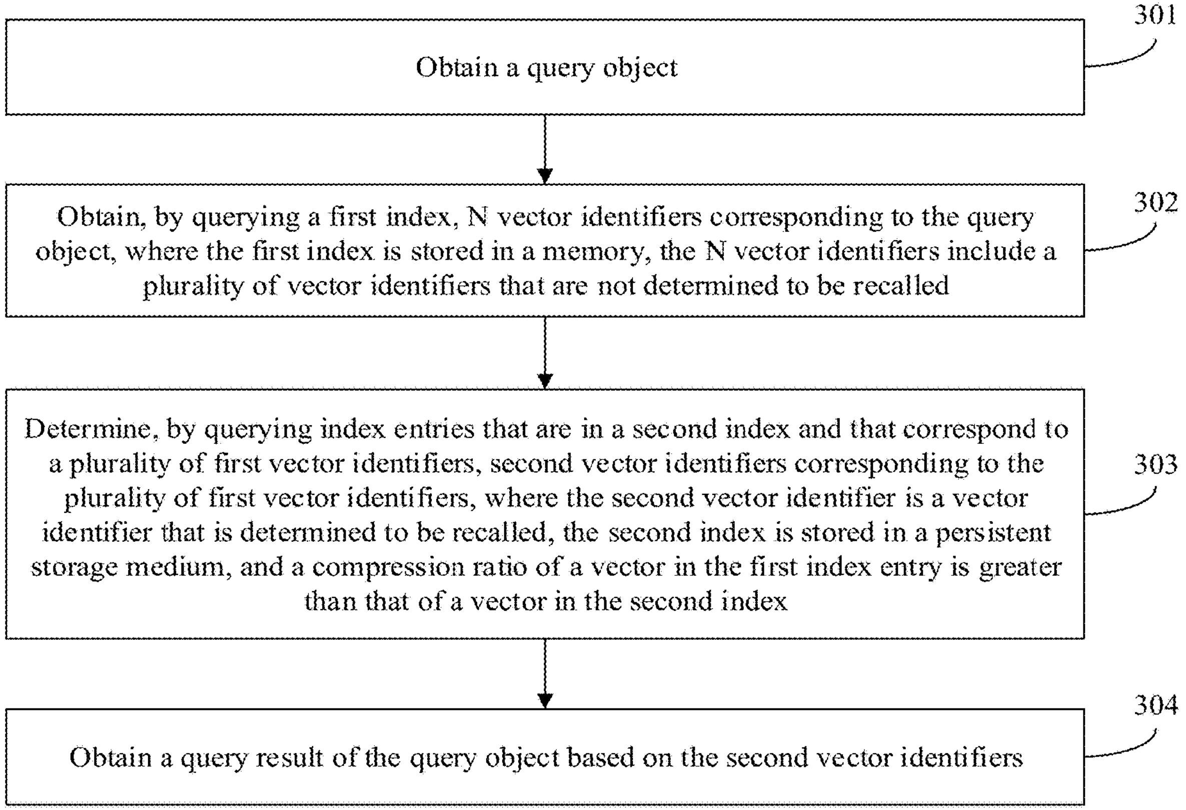
FIG. 3 is a schematic flowchart of a vector search method according to an embodiment of this disclosure.

FIG. 3 is a schematic flowchart of a vector search method according to an embodiment of this disclosure. The method may be applied to the vector engine and the vector model of the search system shown in FIG. 2, to implement high accuracy and a low delay of a vector search. The search system may be deployed in any apparatus, device, platform, or device cluster that has a computing capability for execution. A specific computing device in which the search system is deployed is not further limited in this embodiment of this disclosure, and an appropriate computing device may be selected for deployment as required. As shown in FIG. 3, the vector search method at least includes steps 301 to 305.

Step 301: Obtain a query object.

A query object input by a user is received. The query object may be various modalities such as a text, an image, a voice, and a video. A modality of the query object is not limited in this embodiment of this disclosure.

In other words, the vector search method provided in this embodiment of this disclosure may implement a single-modality query of "searching for a text by using a text" or "searching for an image by using an image", or may implement a multi-modality query of "searching for a text by using a text" or "searching for an image by using an image". Step 302: Obtain, by querying a first index, N vector identifiers corresponding to the query object, where the first index is stored in a memory, N is a positive integer, the N vector identifiers include a plurality of first vector identifiers, and the first vector identifier is a vector identifier that is not determined to be recalled.

Feature extraction is performed on the query object input by the user, to obtain a vector representation of the query object, where the vector representation is a query vector. For example, the query vector is input into a trained encoder, to output a query vector corresponding to the query object.

A type of the query object is not limited in this embodiment of this disclosure. For example, the query object may be a text, an image, a video, or the like.

It may be understood that, when the query object is a text, the encoder is an encoder having a text feature vector extraction function. For example, the encoder may be a BERT model. When the query object is an image, the encoder is an encoder having an image feature vector extraction function, for example, the encoder is an image encoder. When the query object is a video, the encoder is an encoder having a video feature vector extraction function, for example, the encoder is a video encoder.

In subsequent steps, an example in which the query object is an image is used to describe specific implementation of the vector search method provided in this embodiment of this disclosure.

For example, the N vector identifiers are determined from the first index based on a similarity measurement result between the query vector and a first vector in the first index. The first index is stored in the memory.

The first index is stored in the memory, and the first index includes a plurality of vector identifiers (IDs) and a first vector corresponding to each vector identifier. The vector identifier is used to uniquely identify an original vector. The original vector is a vector representation of an image in an image database output by the encoder. The first vector is a vector after quantization of the original vector, and may also be referred to as a quantized vector. The first vector corresponding to the vector identifier means a vector after quantization of an original vector corresponding to the vector identifier.

Because storage space of the memory is limited, to reduce memory overheads, optionally, the original vector may be quantized through product quantization (PQ), to obtain a quantized vector with a high compression ratio. This saves memory space.

In another example, to further improve vector search efficiency, a quantized index may use a hybrid index structure including an inverted index and a hierarchical navigable small world (HNSW) algorithm. For example, a plurality of inverted indexes is constructed in the memory, each inverted index includes a low accuracy encoded vector that is encoded through PQ, a quantity of vectors in each inverted index may be controlled within 1000, and a PQ 16*8 encoding mode may be used for a 32-dimensional original vector during PQ encoding. When a vector search is performed in the memory, the HNSW algorithm is responsible for selecting a specific quantity of inverted indexes based on the query vector, PQ encoded vectors in the selected inverted indexes are traversed in sequence, a similarity between the query vector and each PQ encoded vector is calculated, N vector identifiers are determined based on a similarity measurement result, and the determined N vector identifiers are used as a recall result of a search based on the first index.

A specific similarity calculation method is not limited in this embodiment of this disclosure. Based on an actual situation, an appropriate similarity calculation method may be selected, for example, a Euclidean distance, a cosine distance or cosine similarity, an inner product, and a Hamming distance.

To reduce memory overheads of the first index, PQ with a high compression ratio is performed on first index data. As a result, vector search accuracy is inevitably reduced to some extent. Therefore, a recall result of a vector search based on the first index may also be referred to as a rough recall result. A high accuracy search may be performed on the rough recall result based on a second index stored in a persistent storage medium (for example, a solid-state drive) in a subsequent step, to select topK vector identifiers with higher accuracy from the rough recall result.

Therefore, a recall quantity topN of the rough recall result needs to be greater than a final recall quantity topK of the vector search, that is, the recall quantity topN of the rough recall result needs to have specific redundancy. For example, if the final recall quantity topK of the vector search needs to be 1000, the recall quantity topN of the search based on the first index may be determined to be 4000.

It should be noted that, the N vector identifiers corresponding to the query object mean: the rough recall result obtained by querying by using the first index, for example, the N vector identifiers may be vector identifiers corresponding to vectors that are in the first index and whose similarity to the query vector is greater than a threshold.

In some other examples, the method further includes identifying the N vector identifiers, disposing a classifier module, and classifying the vector identifiers in the rough recall result by using the classifier module, to classify the vector identifiers into a "valid" category, an "undetermined" category, and an "invalid" category. A vector identifier of a valid category indicates a recalled vector identifier whose accuracy meets a requirement and that may be used as a final recall result. A vector identifier of an invalid category indicates a vector identifier whose accuracy does not meet the requirement and that is determined to be invalid and may be discarded. A vector identifier of an undetermined category indicates a vector identifier whose accuracy is between meeting the requirement and not meeting the requirement, and may not be determined to belong to a valid category or an invalid category. For the vector identifier of an undetermined category, a high accuracy vector search needs to continue to perform based on the second index stored in the persistent storage medium, to determine a vector identifier of a valid category.

Optionally, the classifier module may determine a category of the vector identifier in the rough recall result based on a quantized loss value corresponding to the vector identifier. For example, the classifier module calculates loss values between first vectors corresponding to the vector identifiers in the rough recall result and an original vector, sorts the vector identifiers in the rough recall result in descending order based on the loss values, determines categories of first M vector identifiers to be a valid category, determines categories of last J vector identifiers to be an invalid category, and determines categories of the remaining vector identifiers to be an undetermined category.

A vector identifier of a valid category may be used as a part of final topK recall results. A vector identifier of an invalid category is discarded, and only a vector identifier of an undetermined category is delivered to the solid-state drive for a high accuracy search as a candidate set, to determine a vector identifier of a valid category. This reduces an amount of data to be accessed in the solid-state drive, and only index data corresponding to a vector identifier of an undetermined category needs to be accessed. In this way, an amount of data of I/O is reduced, and a search delay of the entire vector search is further reduced.

Step 303: Determine, by querying index entries that are in a second index and that correspond to the plurality of first vector identifiers, second vector identifiers corresponding to the plurality of first vector identifiers, where the second vector identifier is a vector identifier that is determined to be recalled, the second index is stored in a persistent storage medium, and a compression ratio of a vector in the first index is greater than that of a vector in the second index.

For example, the vector identifier of an undetermined category is determined to belong to a valid category or an invalid category based on a similarity measurement result between the query vector and a second vector that is in the second index and that corresponds to the vector identifier of an undetermined category. The second index includes a plurality of vector identifiers and a second vector corresponding to each vector identifier, the second index is stored in the persistent storage medium, and a compression ratio of the first vector is greater than a compression ratio of the second vector.

Second index data stored in the solid-state drive is an index structure that has a low compression ratio and that can provide high accuracy but low query efficiency. The second index includes the vector identifiers and the second vector corresponding to each vector identifier. The vector identifier is the same as the vector identifier in the first index, and is a vector identifier used to uniquely identify an original vector. The second vector may be the original vector, or a vector after scalar quantization (SQ). A quantized vector after SQ encoding has a lower compression ratio, is closer to the original vector, and has higher search accuracy, but has higher storage overheads. The solid-state drive is sufficient to accommodate the storage overheads.

The second index data corresponding to the candidate set is read. The vector identifier in the candidate set is determined to belong to a valid category or an invalid category based on the similarity measurement result between the query vector and the second vector that is in the second index and that corresponds to the vector identifier of an undetermined category, to recall the vector identifier of a valid category.

For example, the second index data corresponding to the candidate set is directly read from the solid-state drive, similarities between the query vector and second vectors are separately calculated, and the vector identifiers are sorted in descending order based on a similarity result. Categories of first E vector identifiers are determined to be a valid category, and categories of the remaining vector identifiers are determined to be an invalid category. The E vector identifiers and the remaining vector identifiers form the topK finally recalled vector identifiers.

Figure 4:
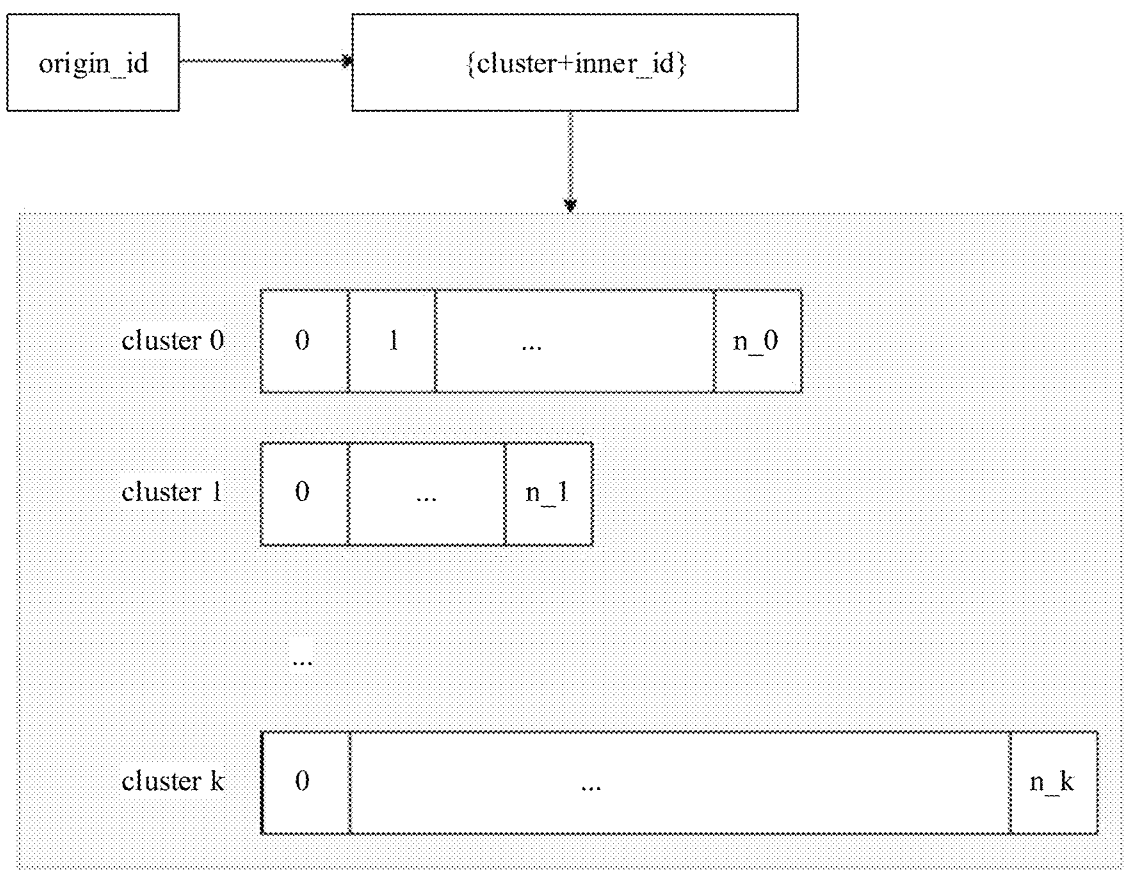
FIG. 4 is a diagram of storing second index data in a solid-state drive in a form of a plurality of clustering clusters.

In another example, to improve I/O efficiency, the second index data is clustering clustered. Index entries that have a same probability of being accessed are aggregated into one clustering cluster, and are stored in a form of a plurality of clustering clusters on the solid-state drive. For example, index entry data in a same clustering cluster is stored in a same storage area on the solid-state drive, to ensure storage continuity of the data in the same clustering cluster (as shown in FIG. 4).

In an example, an index entry in the second index includes a vector and an index pointer corresponding to the vector, and the index pointer is related to an identifier of the clustering cluster and an identifier of the vector in the clustering cluster. For example, the index pointer in the index entry in the second index may be clustering cluster+inner_id in FIG. 4. One index pointer includes a clustering cluster number and an inner number of the vector in the clustering cluster. A storage location of a specific index entry in the second index in the solid-state drive may be indicated by clustering cluster+inner_id, to quickly search for any vector in the second index.

For example, the second index data is clustering clustered as follows. The original vector corresponding to the image in the database is used as a query vector to perform a vector search, to obtain vector identifiers of the second index that is stored in the solid-state drive and that is to be finally accessed, these vector identifiers are abstracted as points, where each point representing a vector identifier is connected to every other point by an edge, and a weight value of each edge is increased by 1, a weighted graph is obtained by querying all query vectors, minimum cut partitioning or graph clustering is performed on the weighted graph by using a clustering algorithm (for example, a community detection algorithm), to obtain a specific quantity of clustering clusters (clustering clusters) according to the clustering algorithm, and if there are many isolated clustering clusters, the foregoing steps continue to be performed. Finally, a plurality of clustering clusters shown in FIG. 4 is finally obtained through layout. Second vectors and vector identifiers that have a spatial similarity are usually grouped into a same clustering cluster, and data in the same clustering cluster is stored in a same storage area of the solid-state drive, and is consecutively stored.

To further improve I/O efficiency, in a vector search process, an access request for the solid-state drive is aggregated, and an access request for index entries in a same clustering cluster is aggregated into a same access request batch. This can reduce an I/O quantity, improve a disk read throughput, and further reduce a search delay.

Figure 5:
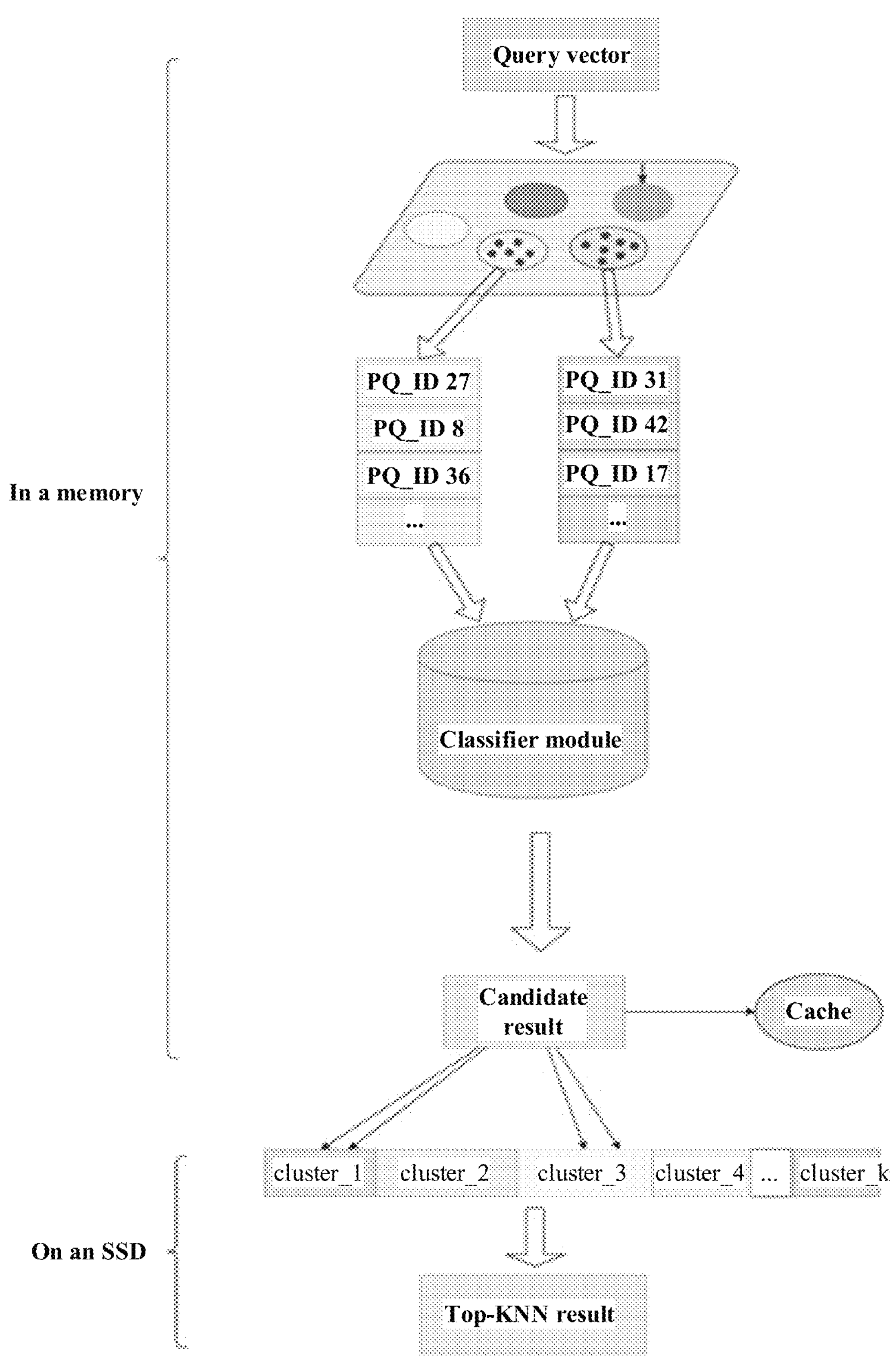
FIG. 5 is a diagram of an implementation process of a vector search method according to an embodiment of this disclosure.

In another example, as shown in FIG. 5, to further reduce a search delay, frequently accessed hot data may be cached. For example, a frequency of accessing the index entry in the second index in the solid-state drive in a plurality of search processes is counted, index entry data whose access frequency is higher than a preset frequency is determined to be hot data, and is cached in the memory.

In this way, after the candidate set is determined, the index entry data of the second index corresponding to the candidate set is first read from the cache, and there is a high probability that the reading succeeds. After the cache hits data, there is no need to access the solid-state drive, significantly improving search efficiency. When the cache misses the data, the data is read from the solid-state drive.

In another example, to increase a cache hit rate, the memory further caches low-quality data, namely, index entry data that is in the second index and that corresponds to a vector identifier with a high probability of being identified as belonging to an undetermined category. For example, a probability that a vector identifier is identified as belonging to an undetermined category in a historical search process is counted, and index entry data that is in the second index and that corresponds to a vector identifier with a higher probability than a preset probability is determined to be the low-quality data and stored in the cache.

In another example, a multi-level caching mechanism is set, the hot data and the low-quality data are stored in a level 1 cache, and data that is read from the solid-state drive in a previous search process is cached in a level 2 cache.

After the candidate set is determined, data is first read from the level 1 cache, if there is a miss, the data is read from the level 2 cache. If there is still a miss, the data is finally read from the solid-state drive. This further increases the cache hit ratio.

The cache stores not only frequently accessed hot data. Therefore, the hit ratio is still high in some unpopular query or hotspot migration scenarios, so that the search delay is still optimized.

The cached data in the level 2 cache is updated with a quantity of vector searches. For example, the level 2 cache is updated with data read from the solid-state drive in a current search process.

The multi-layer cache mechanism is set to pre-load the second index data, to reduce a quantity of accesses to the solid-state drive. A multi-layer cache caches the hot data, the low-quality data, and data loaded last time, ensuring a controllable search delay in both high-frequency query and unpopular query scenarios.

Step 304: Obtain a query result of the query object based on the second vector identifiers.

The vector identifier of a valid category (namely, a third vector identifier) determined in step 302 and the vector identifier of a valid category (namely, the second vector identifier) determined in step 303 are both used as topK target vector identifiers for recall.

Subsequently, based on a similarity measurement result between the query vector and original vectors corresponding to the recalled topK target vector identifiers, the topK target vector identifiers may be re-sorted, to obtain a sorting result, ensuring search accuracy. Then, images corresponding to the topK target vector identifiers are found in the image database, and the images are output and displayed to the user based on the sorting result.

Alternatively, re-sorting is performed based on the similarity measurement result between the query vector and the original vectors corresponding to the topK target vector identifiers and another sorting condition input by the user, to obtain a sorting result. For example, the K target vectors are first sorted in descending order based on the similarity result, that is, a higher similarity is ranked higher. Then, images in a forward database that correspond to the K target vectors are re-sorted based on the condition input by the user, and are output and displayed to the user. For example, if an image input by the user is a shoe, and the condition is red, images of red shoes in the images in the forward database that correspond to the K target vectors are sorted in descending order. Images of shoes that deviate more from a red shoe are sorted lower.

Based on a same concept as the foregoing embodiment of the vector search method, an embodiment of this disclosure further provides a vector search apparatus 600. The vector search apparatus 600 includes units or modules configured to implement the steps in the vector search methods shown in FIG. 3 to FIG. 5.

Figure 6:
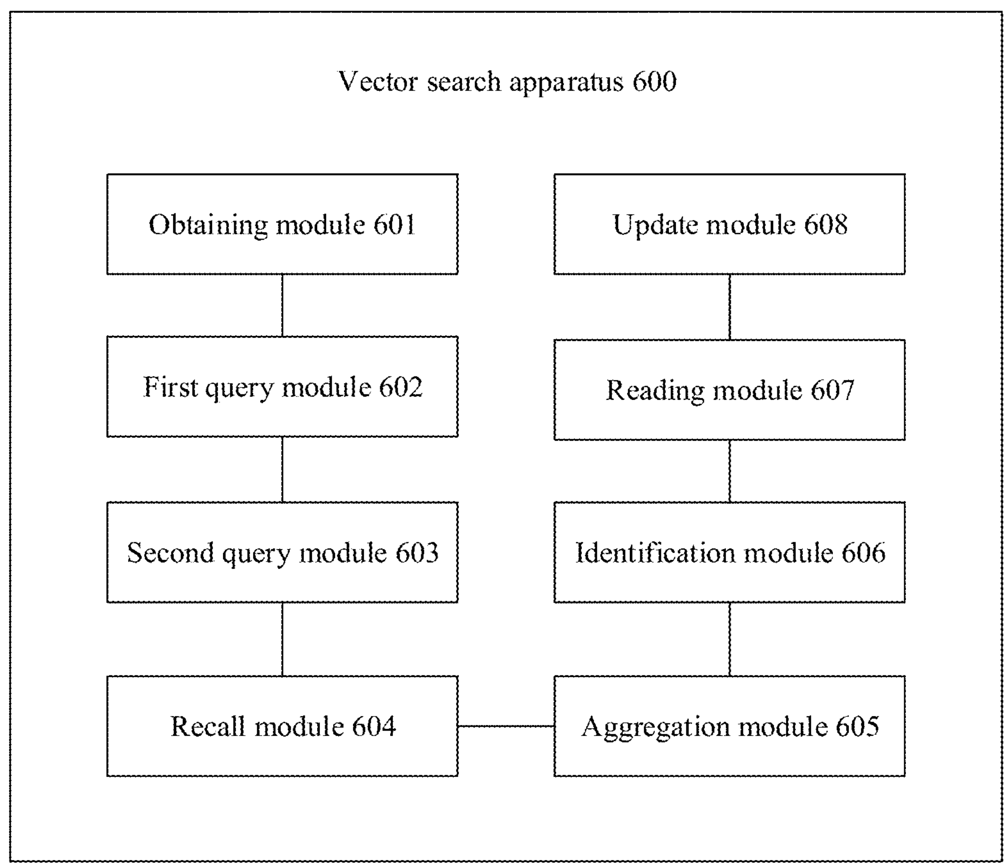
FIG. 6 is a diagram of a structure of a vector search apparatus according to an embodiment of this disclosure.

FIG. 6 is a diagram of a structure of a vector search apparatus according to an embodiment of this disclosure. The apparatus may be deployed in any apparatus, device, platform, or device cluster that has a computing capability, for example, may be a computer or a server, to implement high search accuracy and a low search delay of a vector search in a high recall vector search scenario (for example, topK=1000+).

As shown in FIG. 6, the vector search apparatus 600 at least includes an obtaining module 601, a first query module 602, a second query module 603, and a recall module 604. The obtaining module 601 is configured to obtain a query object. The first query module 602 is configured to obtain, by querying a first index, N vector identifiers corresponding to the query object, where the first index is stored in a memory, N is a positive integer, the N vector identifiers include a plurality of first vector identifiers, and the first vector identifier is a vector identifier that is not determined to be recalled. The second query module 603 is configured to determine, by querying index entries that are in a second index and that correspond to the plurality of first vector identifiers, second vector identifiers corresponding to the plurality of first vector identifiers, where the second vector identifier is a vector identifier that is determined to be recalled, the second index is stored in a persistent storage medium, and a compression ratio of a vector in the first index is greater than that of a vector in the second index. The recall module 604 is configured to obtain a query result of the query object based on the second vector identifiers.

In a possible implementation, the second index includes a plurality of clustering clusters, each clustering cluster includes a plurality of index entries, and all of the index entries in the clustering cluster have a same probability of being accessed in a vector search.

In a possible implementation, the index entry includes a vector and an index pointer corresponding to the vector, and the index pointer is related to an identifier of the clustering cluster and an identifier of the vector in the clustering cluster.

In another possible implementation, the plurality of index entries in the clustering cluster are stored in a same storage area in the persistent storage medium.

In another possible implementation, the vector search apparatus 600 further includes an aggregation module 605. The aggregation module 605 is configured to aggregate an access request for the persistent storage medium, and aggregate an access request for index entries in a same clustering cluster into a same access request batch.

In another possible implementation, the N vector identifiers further include a third vector identifier that is determined to be recalled, and the query result of the query object is related to the third vector identifier.

In another possible implementation, the vector search apparatus 600 further includes an identification module 606. The identification module 606 is configured to identify the N vector identifiers to obtain the first vector identifier and the third vector identifier, where the third vector identifier is a vector identifier that is determined to be recalled.

In another possible implementation, the identification module 606 is further configured to obtain the first vector identifier and the third vector identifier through identification based on a quantized loss value corresponding to each vector identifier in the N vector identifiers, where a quantized loss value of the third vector identifier in the first index is less than a quantized loss value of the first vector identifier in the first index, and the quantized loss value corresponding to each vector identifier is determined based on a loss between a vector that is in the first index and that corresponds to the vector identifier and an original vector corresponding to the vector identifier.

In another possible implementation, the vector search apparatus 600 further includes a reading module 607. The reading module 607 is configured to read a candidate index entry set in the second index, where the candidate index entry set includes the index entries that are in the second index and that correspond to the plurality of first vector identifiers.

In another possible implementation, the reading module 607 is further configured to read the candidate index entry set from level 1 cache space in the memory, where the level 1 cache space stores data that is in the second index and that is accessed at a frequency higher than a preset frequency.

In another possible implementation, the level 1 cache space further stores the first index in the second index, and the first index is an index entry corresponding to a vector identifier whose probability of being determined to be the first vector identifier is greater than a preset probability.

In another possible implementation, the reading module 607 is further configured to read the candidate index entry set in the second index from the level 1 cache space in the memory, when the candidate index entry set in the second index is not read from the level 1 cache space, read the candidate index entry set in the second index from level 2 cache space in the memory, and when the candidate index entry set in the second index is not read from the level 2 cache space, read the candidate index entry set in the second index from the persistent storage medium, where the level 2 cache space stores data read from the persistent storage medium in a previous vector search.

In another possible implementation, the vector search apparatus 600 further includes an update module 608. The update module 608 is configured to update the data in the level 2 cache space with data read from the persistent storage medium.

Optionally, the persistent storage medium is a solid-state drive.

The vector search apparatus 600 according to this embodiment of this disclosure may correspondingly perform the methods described in embodiments of this disclosure. In addition, the foregoing and other operations and/or functions of modules of the vector search apparatus 600 are separately used to implement corresponding procedures of the methods in FIG. 3 to FIG. 5. For brevity, details are not described herein again.

Based on a same concept as the foregoing method embodiments, an embodiment of this disclosure further provides a computing device. The computing device at least includes a processor and a memory. The memory stores a program. When the program is executed by the processor, units or modules in the steps in the methods shown in FIG. 3 to FIG. 5 may be implemented.

Figure 7:
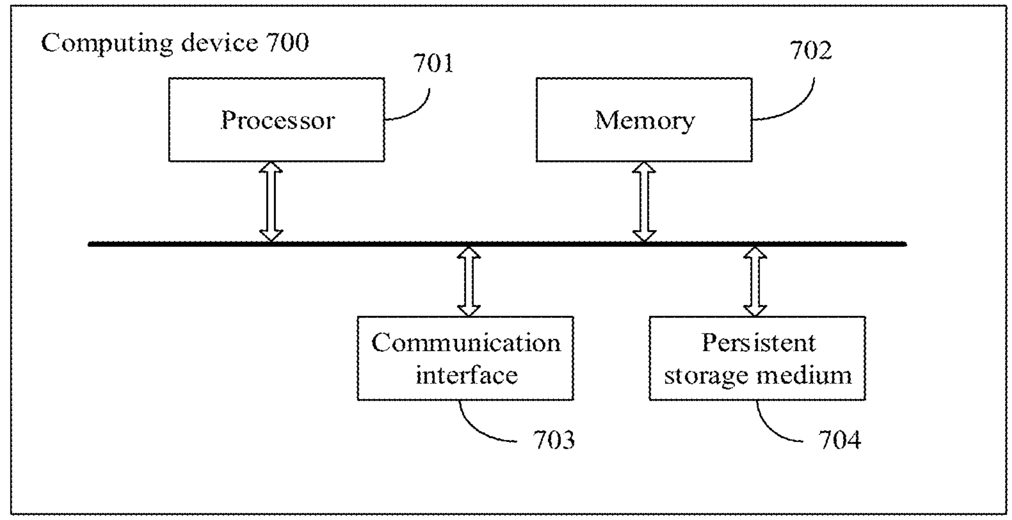
FIG. 7 is a diagram of a structure of a computing device according to an embodiment of this disclosure.

FIG. 7 is a diagram of a structure of a computing device according to an embodiment of this disclosure.

As shown in FIG. 7, the computing device 700 includes at least one processor 701, a memory 702, a communication interface 703, and a persistent storage medium 704. The processor 701, the memory 702, the communication interface 703, and the persistent storage medium 704 may be communicatively connected to each other in a wired manner (for example, a bus), or in a wireless manner. The communication interface 703 is configured to receive data (for example, querying an image or querying text data) sent by another device. The memory 702 stores first index data. The persistent storage medium 704 stores second index data and computer instructions. The processor 701 executes the computer instructions to perform the methods in the foregoing method embodiments.

It should be understood that, in embodiments of this disclosure, the processor 701 may be a central processing unit (CPU), or the processor 701 may be another general purpose processor, a digital signal processor (DSP), or an application-specific integrated circuit (ASIC), a field-programmable gate array (FPGA) or another programmable logic device, a discrete gate or transistor logic device, a discrete hardware component, or the like. The general-purpose processor may be a microprocessor or any other processor or the like.

The memory 702 is a random-access memory (RAM), and may provide instructions and data for the processor 701. The persistent storage medium 704 is a non-volatile RAM, and may store data persistently.

The non-volatile memory may be a read-only memory (ROM), a programmable ROM (PROM), an erasable PROM (EPROM), an electrically EPROM (EEPROM), or a flash memory. The memory 702 is a volatile memory, and may be a RAM, and is used as an external cache. By way of example but not limitative description, RAMs in many forms may be used, for example, a static RAM (SRAM), a dynamic RAM (DRAM), a synchronous DRAM (SDRAM), a double data rate (DDR) SDRAM, an enhanced SDRAM (ESDRAM), a synchronous link (synchlink) DRAM (SLDRAM), and a Direct Rambus (DR) RAM.

It should be understood that the computing device 700 according to embodiments of this disclosure may implement the methods shown in FIG. 3 to FIG. 5 in embodiments of this disclosure. For detailed descriptions of an implementation of the methods, refer to the foregoing descriptions. For brevity, details are not described herein again.

An embodiment of this disclosure provides a computer-readable storage medium. The computer-readable storage medium stores a computer program. When the computer instructions are executed by a processor, the foregoing methods are implemented.

An embodiment of this disclosure provides a chip. The chip includes at least one processor and an interface. The at least one processor determines program instructions or data by using the interface. The at least one processor is configured to execute the program instructions to implement the foregoing methods.

An embodiment of this disclosure provides a computer program or a computer program product. The computer program or the computer program product includes instructions. When the instructions are executed, a computer is enabled to perform the foregoing methods.

A person of ordinary skill in the art may be further aware that, in combination with the examples described in embodiments disclosed in this specification, units and algorithm steps can be implemented by electronic hardware, computer software, or a combination thereof. To clearly describe interchangeability between hardware and software, the foregoing generally describes compositions and steps of the examples based on functions. Whether these functions are performed in a hardware manner or a software manner depends on a particular application and a design constraint condition of the technical solutions. A person of ordinary skill in the art may use different methods to implement the described functions for each particular application, but it should not be considered that the implementation goes beyond the scope of this disclosure.

The steps of the methods or algorithms described in embodiments disclosed in this specification may be implemented by hardware and a software module executed by the processor or a combination of hardware and a software module executed by the processor. The software module may be configured in a RAM, a memory, a ROM, an EPROM, an EEPROM, a register, a hard disk, a removable disk, a compact disc (CD) ROM (CD-ROM), or a storage medium in any other forms well-known in the art.

In the foregoing specific implementations, the objective, technical solutions, and beneficial effects of this disclosure are further described in detail. It should be understood that the foregoing descriptions are merely specific implementations of this disclosure, but are not intended to limit the protection scope of this disclosure. Any modification, equivalent replacement, or improvement made without departing from the spirit and principle of this disclosure should fall within the protection scope of this disclosure.

The invention claimed is:

1. A computer-implemented method comprising:

obtaining a query object;

obtaining, by querying a first index, N vector identifiers corresponding to the query object, wherein the first index is in a memory, wherein N is a positive integer, wherein the N vector identifiers comprise first vector identifiers, and wherein each of the first vector identifiers is not to be recalled;

determining, by querying first index entries that are in a second index and that correspond to the first vector identifiers, second vector identifiers corresponding to the first vector identifiers, wherein each of the second vector identifiers is to be recalled, wherein the second index is in a persistent storage medium, and wherein a first compression ratio of a first vector in the first index is greater than a second compression ratio of a second vector in the second index; and obtaining based on the second vector identifiers, a query result of the query object.

2. The method of claim 1, wherein the second index comprises clustering clusters, and wherein each of the clustering clusters comprises second index entries having a same probability of being accessed in a vector search.

3. The method of claim 2, wherein each of the second index entries comprises a third vector and an index pointer corresponding to the third vector, and wherein the index pointer is related to a first identifier of a corresponding clustering cluster and a second identifier of the third vector in the corresponding clustering cluster.

4. The method of claim 2, further comprising storing the second index entries in a same storage area in the persistent storage medium.

5. The method of claim 2, further comprising:

aggregating a first access request for the persistent storage medium; and aggregating a second access request for the second index entries in a same clustering cluster into a same access request batch.

6. The method of claim 1, wherein the N vector identifiers further comprise a third vector identifier that is to be recalled, and wherein the query result is related to the third vector identifier.

7. The method of claim 1, further comprising identifying the N vector identifiers to obtain the first vector identifiers and a third vector identifier, wherein the third vector identifier is to be recalled.

8. The method of claim 7, wherein each of the N vector identifiers corresponds to a vector in the first index, an original vector, and a quantized loss vector that is based on a loss between the vector in the first index and the original vector, and wherein identifying the N vector identifiers comprises:

obtaining the first vector identifiers through identification based on a first quantized loss value corresponding to each of the first vector identifiers; and obtaining the third vector identifier through identification based on a second quantized loss value corresponding to the third vector identifier, wherein the second quantized loss value of the third vector identifier in the first index is less than the first quantized loss value of the first vector identifiers in the first index.

9. The method of claim 1, further comprising reading a candidate index entry set in the second index, wherein the candidate index entry set comprises the first index entries.

10. The method of claim 9, wherein reading the candidate index entry set comprises reading the candidate index entry set from a level 1 cache space in the memory.

11. The method of claim 10, wherein the first index corresponds to a vector identifier having a probability of being a first vector identifier that is greater than a preset probability.

12. The method of claim 9, wherein reading the candidate index entry set comprises:

reading from a level 1 cache space in the memory to read the candidate index entry set in the second index;

reading from a level 2 cache space in the memory to read the candidate index entry set in the second index when the candidate index entry set in the second index is not successfully read from the level 1 cache space; and reading from the persistent storage medium to read the candidate index entry set in the second index when the candidate index entry set in the second index is not successfully read from the level 2 cache space.

13. The method of claim 12, wherein the level 2 cache space stores first data read from the persistent storage medium in a previous vector search, and wherein the method further comprises updating the first data with second data read from the persistent storage medium.

14. An apparatus comprising:

a memory configured to store instructions; and at least one processor coupled to the memory, wherein when executed by the at least one processor, the instructions cause the apparatus to:

obtain a query object;

obtain, by querying a first index, N vector identifiers corresponding to the query object, wherein the first index is in a memory, wherein N is a positive integer, wherein the N vector identifiers comprise a plurality of first vector identifiers, and wherein each of the first vector identifiers is not to be recalled;

determine, by querying first index entries that are in a second index and that correspond to the first vector identifiers, second vector identifiers corresponding to the first vector identifiers, wherein each of the second vector identifiers is to be recalled, wherein the second index is in a persistent storage medium, and wherein a first compression ratio of a first vector in the first index is greater than a second compression ratio of a second vector in the second index; and obtain, based on the second vector identifiers, a query result of the query object.

15. The apparatus of claim 14, wherein the second index comprises clustering clusters, and wherein each of the clustering clusters comprises second index entries having a same probability of being accessed in a vector search.

16. The apparatus of claim 15, wherein each of the second index entries comprises a third vector and an index pointer corresponding to the third vector, and wherein the index pointer is related to a first identifier of a corresponding clustering cluster and a second identifier of the third vector in the corresponding clustering cluster.

17. The apparatus of claim 15, wherein when executed by the at least one processor the instructions further cause the apparatus to store the second index entries in a same storage area in the persistent storage medium.

18. The apparatus of claim 15, wherein when executed by the at least one processor, the instructions further cause the apparatus to:

aggregate a first access request for the persistent storage medium; and aggregate a second access request for the second index entries in a same clustering cluster into a same access request batch.

19. The apparatus of claim 14, wherein the N vector identifiers further comprise a third vector identifier that is to be recalled, and wherein the query result is related to the third vector identifier.

20. The apparatus of claim 14, wherein when executed by the at least one processor, the instructions further cause the apparatus to identify the N vector identifiers to obtain the first vector identifiers and a third vector identifier, and wherein the third vector identifier is to be recalled.

* * * * *